United States Patent [19]
Barkac et al.

[11] Patent Number: 6,077,608
[45] Date of Patent: Jun. 20, 2000

[54] MULTILAYERED COATING WITH POWDER CLEAR COATING AND SUBSTRATES THEREWITH AND METHOD

[75] Inventors: Karen A. Barkac, Murrysville; Joseph Benga, Allison Park; John M. Furar, Pittsburgh; Charles M. Kania, Natrona Heights; Gaurav Agrawal, Pittsburgh; Paul H. Lamers, Allison Park, all of Pa.

[73] Assignee: PPG Industries Ohio, Inc., Cleveland, Ohio

[21] Appl. No.: 08/932,505

[22] Filed: Sep. 18, 1997

Related U.S. Application Data

[60] Provisional application No. 60/026,936, Sep. 19, 1996.

[51] Int. Cl.$^7$ ...................................................... B32B 9/04
[52] U.S. Cl. ........................................................ 428/411.1
[58] Field of Search .......................................... 428/411.1

[56] References Cited

U.S. PATENT DOCUMENTS

| | | | |
|---|---|---|---|
| 3,931,836 | 1/1976 | Thiele | 728/412 |
| 3,936,530 | 2/1976 | Morgan | 427/43 |
| 3,959,405 | 5/1976 | Labana et al. | 260/836 |
| 4,027,066 | 5/1977 | Victorius | 428/334 |
| 4,042,645 | 8/1977 | Hirota et al. | 260/830 P |
| 4,069,275 | 1/1978 | Labana et al. | 260/836 |
| 4,091,049 | 5/1978 | Labana et al. | 260/836 |
| 4,147,679 | 4/1979 | Scriven et al. | 260/29.2 TN |
| 4,246,368 | 1/1981 | Murase | 525/117 |
| 4,248,744 | 2/1981 | Masar et al. | 260/17.4 SG |
| 4,346,144 | 8/1982 | Craven | 428/335 |
| 4,403,003 | 9/1983 | Backhouse | 427/407.1 |
| 4,539,363 | 9/1985 | Backhouse | 524/460 |
| 4,650,718 | 3/1987 | Simpson et al. | 428/413 |
| 4,675,358 | 6/1987 | Frangou | 524/439 |
| 4,681,811 | 7/1987 | Simpson et al. | 428/413 |
| 4,689,131 | 8/1987 | Roue et al. | 204/181.7 |
| 4,703,101 | 10/1987 | Singer et al. | 528/87 |
| 4,753,998 | 6/1988 | Hayes et al. | 525/275 |
| 4,804,581 | 2/1989 | Geary et al. | 428/332 |
| 4,818,791 | 4/1989 | Murakami et al. | 525/124 |
| 4,851,460 | 7/1989 | Stranghoner et al. | 523/407 |
| 4,914,148 | 4/1990 | Hille et al. | 524/507 |
| 4,988,767 | 1/1991 | Pettit, Jr. | 525/194 |
| 5,034,432 | 7/1991 | Ueno et al. | 523/221 |
| 5,057,348 | 10/1991 | Drain | 428/76 |
| 5,071,904 | 12/1991 | Martin et al. | 524/458 |
| 5,198,490 | 3/1993 | Berg et al. | 524/443 |
| 5,202,382 | 4/1993 | Pettie, Jr. | 525/108 |
| 5,212,245 | 5/1993 | Franks et al. | 525/223 |
| 5,219,939 | 6/1993 | Wamprecht et al. | 525/117 |
| 5,270,391 | 12/1993 | Miyazaki et al. | 525/194 |
| 5,290,845 | 3/1994 | Berg et al. | 524/443 |
| 5,337,184 | 8/1994 | Helms et al. | 359/270 |
| 5,370,910 | 12/1994 | Hille et al. | 427/407.1 |
| 5,384,358 | 1/1995 | Wamprecht et al. | 525/28 |
| 5,407,706 | 4/1995 | Kano et al. | 427/386 |
| 5,407,707 | 4/1995 | Simeone et al. | 427/410 |
| 5,412,023 | 5/1995 | Hille et al. | 524/539 |
| 5,492,955 | 2/1996 | Wamprecht et al. | 525/375 |
| 5,494,977 | 2/1996 | Harano et al. | 525/438 |
| 5,510,428 | 4/1996 | Harano et al. | 525/438 |
| 5,512,322 | 4/1996 | Hille et al. | 427/407.1 |
| 5,521,250 | 5/1996 | Wamprecht et al. | 525/130 |
| 5,547,758 | 8/1996 | Watanabe et al. | 428/413 |

FOREIGN PATENT DOCUMENTS

| | | |
|---|---|---|
| 2049837 | 3/1992 | Canada . |
| 2064292 | 10/1992 | Canada . |
| 0 509 392 | 10/1992 | European Pat. Off. . |
| 0 522 648 | 1/1993 | European Pat. Off. . |
| 0 544 206 | 6/1993 | European Pat. Off. . |
| 0602497 | 6/1994 | European Pat. Off. . |
| 0 652 265 | 5/1995 | European Pat. Off. . |
| 0 773 267 | 5/1997 | European Pat. Off. . |
| 0 773 268 | 5/1997 | European Pat. Off. . |
| 4032391 | 4/1992 | Germany . |
| 19534432 | 3/1997 | Germany . |
| 52-69936 | 6/1977 | Japan . |
| 61-252276 | 11/1986 | Japan . |
| 3-126777 | 5/1991 | Japan . |
| 1562408 | 3/1980 | United Kingdom . |
| WO97/30131 | 8/1997 | WIPO . |

OTHER PUBLICATIONS

Principles Of Polymer Chemistry (1953), Cornell University Press pp. 52–57.

*Primary Examiner*—Paul R. Michl
*Attorney, Agent, or Firm*—Paul S. Chirgott; Kenneth J. Stachel

[57] ABSTRACT

Cured thermoset multilayered composite coatings with a powder clear coat and a waterborne base coat have improved chip resistance for the coating. The waterborne base coat composition has one or more crosslinkable film-forming polymers, one or more crosslinking agents for crosslinking the film-forming polymer, and one or more pigments. This basecoat is applied to a bare or previously painted substrate to give a film thickness in the range of about 0.1 to 3 mils (2.54 to 76.2 microns). The basecoat is dehydrated from treatment at a temperature from ambient to an elevated temperature of up to about 90° C. for up to about 15 minutes before it is contacted with powder clear coating composition. The powder clear coating composition has a predominant amount of one or more crosslinkable, meltable and mobile film-forming polymer and/or copolymer having a weight average molecular weight of one or polymers/copolymers in the range of about 2000 to about 6000. The film-forming polymer or copolymer has an amount of functionality for crosslinking of at least 40 weight percent of the total resin solids for the polymers. The glass transition temperature for the powder coating composition is at least about 25° C. The powder coating composition for the clear coat also has one or more crosslinking agents and when cured has a film thickness in the range of about 35 to about 100 microns. The basecoat and clear coat are co-cured. Optionally, one or more primer coats may be beneath the basecoat.

16 Claims, 2 Drawing Sheets

MULTILAYERED COATING WITH POWDER CLEAR COATING AND SUBSTRATES THEREWITH AND METHOD

This application claims the benefit of U.S. Provisional Application Ser. No. 60/026,936, filed Sep. 19, 1996.

FIELD OF THE INVENTION

The present invention relates to cured, thermoset multilayered composite coatings of clear coating and base coating for substrates such as metallic and plastic substrates. A thermosetting powder coating composition provides the clear coat which is cured at least to some degree along with the base coat to form the thermoset multilayered composite coating. This composite coating has improved chip resistance. Additionally, the multilayered composite coating on the substrate can have, and usually does have for automotive coatings, a cured primer coating layer beneath the base coat layer. The method of forming the cured thermoset base coat and clear coat composite coating assists in improving chip resistance.

Solid particulate coating formulations referred to in the industry as "powder coatings" are finding increasing use in painting metal substrates both as primer coatings and as top or clear coats of the base coat and clear coat composite coatings. The automotive industry provides corrosion protection and decorative appearance for motor vehicles by multilayered coating or paint composites on the various types of surfaces of motor vehicles. The finishing layers of this composite usually include the popular base coat and clear coat composite coatings. The base coat is a pigmented layer and the clear coat is a nonpigmented or only slightly pigmented layer that is applied separately to the base coat and cured to some degree (co-cured) with the base coat. The automotive industry strives to provide improved coating composites for motor vehicles by seeking solutions to the problem of abrasive chipping of the paint from the action of road dirt and debris, like sand and gravel, that may strike areas of the vehicle such as the hood, and lower portions of the vehicle such as rocker panels. These strikes can be with considerable impact velocity to result in unaesthetic chipping of the clear coat which can expose one or more underlying layers of a multilayered coating composite and which can also contribute to rusting.

Chipping in a multilayered coating composite can involve several failure mechanisms such as adhesive failure between layers of the multilayered composite or cohesive failure within a layer. To obtain good protection against chipping damage, the main underlying layers of the multilayered composite should have good intercoat or interlayer adhesion. Typically, clear coats which are generally the outermost layer of the multilayered composite typically assist in providing the properties of good appearance and environmental protection from etch, scratch and UV degradation along with good intercoat adhesion with the base coat.

Utilizing powder coatings and other coatings like waterborne coatings on substrates continues to grow in the coatings industry in an effort to adopt more environmentally acceptable materials and practices. For instance, powder clear coats and waterborne base coats of multilayered composite coatings have gained acceptance for their advantages in application with lower organic solvent emissions. Powder coatings typically have very low levels of volatile solvents, i.e., on the order of two percent or slightly higher but generally much less than other paint systems.

Generally, powder coating manufacturers have focused on improving the appearance, protection, and processability features of powder coatings to extract the environmental benefits of these coatings rather than any contribution of these coatings to chip resistance of the multilayered composite. For instance, good storage stability of the powder composition and good appearance properties of the resulting powder coating served as the goal for the thermosetting curable powder coatings of U.S. Pat. Nos. 5,270,391 and 5,407,706. These powder coating compositions have epoxy functional acrylic copolymers in blends of either 1) a high softening point glycidyl-containing acrylic with a low softening point glycidyl-containing acrylic or 2) different viscosities for acrylic polymers.

The aforementioned patents do not consider or discuss any resistance to abrasive chipping for powder coatings. A concern for such chipping develops when powder clear coating compositions overlay certain types of base coat compositions such as waterborne base coats. The use of such coatings in a multilayered composite coating may result in more of a problem with abrasive chipping.

It is an object of the present invention to provide a multilayered or multicomponent composite coating of a clear coating composition and a base coating composition which provide improved chip resistance for the multilayered composite coating without a detrimental effect on the appearance properties of the coating.

SUMMARY OF THE INVENTION

In accordance with the present invention, a cured, thermoset, multicomponent composite coating is provided with improved resistance to abrasive chipping. The composite coating has a waterborne base coat composition which when dehydrated from treatment at a temperature of up to about 90° C. for up to about 15 minutes is contacted with powder clear coating composition. The base coat composition when applied to an uncoated, painted, or coated substrate gives a film thickness as a base coating in the range of about 0.1 to 3 mils (2.54 to 76.2 microns). Also the base coat composition has one or more crosslinkable film-forming polymers, one or more crosslinking agents for crosslinking the film-forming polymer, and one or more pigments. The powder clear coating composition has a predominant amount of one or more crosslinkable, meltable and mobile film-forming polymer and/or copolymer having a weight average molecular weight of the one or polymers/copolymers in the range of about 2000 to about 6000 and an amount of functionality for crosslinking of at least 40 weight percent of the total resin solids for the polymers. The glass transition temperature for the powder coating composition is at least about 25° C. The powder coating composition for the clear coat also has one or more crosslinking agents and when cured has a film thickness in the range of about 35 to about 100 microns. Also the crosslinkable film-forming polymer or copolymer of the powder clear coat is compatible with the base coat, and the powder clear coat and the base coat are cured together to provide the multicomponent composite coating. This compatibility reduces any adverse interaction between the crosslinkable mobile film-forming polymer of the clear powder coating and any interfering chemical components of the basecoat that may reduce the mobility of the mobile film-forming polymer/copolymer.

Another aspect of the invention is the method of forming a cured multicomponent composite coating on a substrate which includes waterborne base coat and powder clear coat and, optionally, a primer coating under the base coat. The waterborne base coat with one or more film forming polymers or copolymers, one or more crosslinking agents, and one or more pigments is dehydrated at a temperature of up to 90° C. for up to 15 minutes. The powder clear coat composition is applied to the dehydrated base coat and these are co-cured to obtain a crosslinked thermoset multiple composite coating. The crosslinkable, meltable, flowable and mobile film-forming polymer of the powder clear coat has the weight average molecular weight in the range of about 2000 to about 6000 and the amount of crosslinkable functionality of at least 40 weight percent of the total resin solids of the powder clear coat composition. This mobile polymer and/or copolymer can have the weight average molecular weight, glass transition temperature ("Tg"), and content of crosslinkable functionality as shown in the ranges of Table A infra. This polymer is in the powder clear coat coating in a migration effective amount so that an analytically detectable amount of the polymer is present in the basecoat at the surface or interface furthest from the powder clear coat and base coat interface. The cured multicomponent composite coating on substrates like those with electrodeposited primer coatings over prepared metallic surfaces have improved adhesion between the clear coat and base coat and any adjacent primer coat layers.

DETAILED DESCRIPTION OF THE PRESENT INVENTION

In the following discussion, unless explicitly stated otherwise, the ranges of amounts, molecular weights, ratios, temperatures, time, and reaction conditions and the like usually can be varied to a degree from about the lower stated number to about the higher stated number of each specific range. By the term "film forming", it is meant that 1) the particulate polymeric material of a powder coating upon melting and curing at elevated temperature or 2) the polymeric material dispersed or solubilized in a solvent or carrier upon drying or evaporation of the solvent or carrier and curing of the polymeric material forms a self-supporting continuous film on at least a horizontal surface. Also by the term "powder", it is meant a particulate, finely divided solid polymeric material generally having a particle size of 0.005 to 100 microns.

It is believed but the present invention is not limited by this belief that the improved chip resistance results from increased migration of the functional crosslinkable film-forming polymer of the powder clear coat enabling a sufficient amount of functionality to be at the proper depth within the base coat of the composite coating.

For the purposes of the invention of this application, the term "mobility through migration" means the functional crosslinkable film-forming polymer of the powder clear coat can move from the clear coat through and into the waterborne base coat prior to curing of the composite coating. The amount of the functional crosslinkable film-forming polymer that migrates into the base coat to improve chip resistance is an amount in the range of 0.1 to 5 weight percent of the functional crosslinkable film-forming polymer in the powder clear coat composition. Preferably, this amount of the film-forming polymer from the clear coat is within the depth of the basecoat of up to 5 microns of the basecoat interface with a cured primer coating layer under the basecoat layer.

For the purposes of the invention of this application, the term "chip resistance" means the multilayered composite coating passes one or more chip resistance tests known to those skilled in the art. For instance, the chip resistance test can be used that is described in the Society of Automotive Engineer's Technical Report J400. The test consists of projecting a standardized road gravel by means of a control air blast onto a suitable test panel. The testing apparatus is contained in a box on wheels, called a gravelometer, designed to contain road gravel, a test holder, and a gravel projecting mechanism. The gravel can be water-worn gravel rather than crushed limestone or rock, which will pass through ⅜ inch (9.5 mm) screen when graded, but be retained on ⅜ inch (9.5 mm) screen. The projecting mechanism, located in the front of the test panel, consists of an air nozzle in the base of a pipe T. The stem of the pipe T points upward and is connected to a funnel into which the gravel is poured. The gravel, falling into the air blast, is projected toward and impacts upon the test panel, which is usually held perpendicular to the impinging gravel. All testing is conducted at room temperature. After gravel impact, masking tape is applied to remove any loose chips remaining on the panel, and the degree of chipping is determined by counting the number and size of all chips.

The powder clear coat for the multilayered composite coating of the present invention has the mobile crosslinkable film-forming polymer along with the crosslinking agent. Examples of such mobile film-forming polymers include the following types of polymers: one or more solid particulate acrylic polymers and copolymers with crosslinkable groups like epoxy or glycidyl. Generally, the other acrylic polymers and copolymers can be used as long as their molecular weight (Mn or Mw) is in a range similar to the range for the epoxy acrylic polymer. These acrylic polymers and copolymers can have other functional groups with abstractable hydrogen such as hydroxyl, carboxyl, and amino and suitable noninterfering mixtures thereof.

One particularly useful powder coating composition is one having generally: I) as the predominant film-forming polymer of the powder coating at least one epoxy functional acrylic polymer or copolymer (hereinafter referred to as "epoxy acrylic polymer"), and II) polycarboxylic acid crosslinking or curing agent where the ratio of epoxy functionality for (I) to acid functionality for (II) is about 1:0.6 to 1.4. When a single epoxy acrylic polymer is the predominant film-forming polymer, the polymer has a molecular weight range, a range of glass transition temperature (Tg), and a range of epoxy content all as shown in Table A below. When more than one epoxy acrylic polymer is used, at least two of the polymers are present in a blend of epoxy acrylic polymers. Such a blend can have the addition type of polymerization residue of styrene resulting from an amount of styrene monomer of up to about 39 weight percent of the total monomers used to prepare the epoxy acrylic polymers of the blend. In the blend the polymer with the lower epoxy content has less that 25 weight percent of such a polymerization residue from styrene based on the total monomers used to prepare that epoxy acrylic polymer. In such polymer blends, the number average molecular weight and Tg of a first and second epoxy acrylic polymer are as shown in Table A below for one and the other of the epoxy acrylic polymers.

TABLE A

|  | Mn (grams) | Tg °C.[1] | Epoxy Content[2] |
|---|---|---|---|
| Single Epoxy Acrylic Polymer | about 1000 to about 5500 | about 30 to about 60° C. as measured or 50 to 85° C. | 35 to 85 |
| Blend of Epoxy Acrylic Polymers | A) about 1000 to about 10,000 | about 40 to about 85 calculated | 40 to 60 |
|  | B) about 500 to about 3000 | about 35 to about 125 | 50 to 100 |

[1]as calculated by the Acrylic Glass Transition Temperature Analyzer from Rohm and Haas Company, which is based on the Fox equation.
[2](GMA) Weight Percent of the monomers to prepare the epoxy acrylic polymer.

In the blend of epoxy acrylic polymers, one polymer has a higher epoxy content within the higher range shown in Table A, and both of the polymers of the blend have relatively low molecular weights. The epoxy acrylic polymer with the higher epoxy content usually has the lower molecular weight between the two polymers in the blend. When a blend of more than two epoxy acrylic polymers are in the powder coating as the predominant film-forming polymers, at least two of these polymers have their number average molecular weights and Tgs in the aforelisted ranges of Table A for a first and second epoxy acrylic polymer. Generally, the ratio of the low epoxy content polymer to the higher epoxy content polymer is in the range of 90:10 to 10:90.

The one or more epoxy acrylic polymers can be formed by addition polymerization under free radical initiated conditions from at least the following: (i) about 20 to about 100 percent by weight of the total monomers of a glycidyl functional copolymerizable ethylenically unsaturated monomer; and (ii) up to about 65 percent by weight of one or more copolymerizable ethylenically unsaturated monomer or mixture of monomers. The exact amount of each monomer (i) and (ii) depends on whether one or a blend of the epoxy acrylic polymer is used as the predominant film-forming polymer for the powder coating composition. With a single polymer the particular amounts of (i) and (ii) are from about 20 to about 75 percent by weight of (i) and about 25 to 65 percent by weight of (ii) monomers. The monomers of (ii) that are free of glycidyl functionality typically are in an effective amount with the other monomers to yield the desired Tg for the epoxy acrylic polymer. The percents by weight for the monomers of (i) and (ii) are based on the weight of (i) and (ii) for each polymer of the blend.

Generally, the amount of the at least one particulate film-forming epoxy acrylic polymer as a polymeric material is from 60 to 99.99 percent by weight based on the weight of solids of the curable clear powder coating composition. Generally, the amount of the polycarboxylic acid crosslinking agent is in the range of about 10 to about 40 weight percent based on the weight of (I) and (II).

For the film-forming polymeric epoxy acrylic polymer for the predominant film-forming polymer of the curable powder coating, whether as the single polymer or the blend, the Tgs of Table A generally can be calculated by any method known to those skilled in the art. The Tg of the copolymer contributes to the stability of the powder coating composition. Generally, the higher the Tg of the polymer, the better the stability of the coating. The Tg is described in PRINCIPLES OF POLYMER CHEMISTRY (1953), Cornell University Press. The Tg can actually be measured or it can be calculated as described by Fox in *Bull. Amer. Physics Soc.*, 1, 3 page 123 (1956). The actual measured values for the Tg are obtainable by differential scanning calorimetry (DSC) usually at a rate of heating of 18° F. (10° C.) per minute where the Tg is taken at the first inflection point. Also, the Tg can be measured experimentally by using a penetrometer such as a DuPont 940 5 Thermomedian Analyzer or comparable equipment from Perkin-Elmer Corporation. The Tg of the polymers as used herein for this invention refers to the calculated values unless otherwise indicated.

The epoxy acrylic polymer can be prepared by copolymerizing a glycidyl functional ethylenically unsaturated monomer (i), typically a glycidyl functional lo acrylic monomer, such as glycidyl acrylate or glycidyl methacrylate, with (ii) an ethylenically unsaturated monomer or mixture of monomers free of glycidyl functionality. Preferably, in the practice of the invention where the polymer is the single main film-forming polymer of the coating composition, the glycidyl functional monomer (i) can be copolymerized with one or more (ii) monomers having a Tg greater than 200° F. (93° C.). A high Tg monomer can assist in preventing caking and instability problems associated with powder coatings. Suitable monomers include methylmethacrylate and methacrylic acid ester or acrylic acid ester having an alicyclic hydrocarbon group having 5 to 22 carbon atoms more suitably 5 to 10 carbon atoms in the ester portion. Suitable examples include: cyclopentyl methacrylate, cyclohexyl methacrylate, methylcyclohexylmethacrylate, trimethylcyclohexyl methacrylate, norbornylmethacrylate, norbornylmethyl methacrylate, isobornyl methacrylate and the like. The amount of styrene on a weight percent basis of the total monomers for the single type epoxy acrylic polymer is preferably up to about 20 weight percent of the total monomers. When styrene is absent from the epoxy copolymer, it is preferred to have at least one of the aforementioned high Tg ethylenically unsaturated monomers as monomers to prepare the epoxy acrylic polymer. Also other ethylenically unsaturated monomers can be used in the preparation of the one or more epoxy acrylic polymers such as hydroxyalkylacrylates and hydroxyalkylmethacrylates such as hydroxypropylacrylate, hydroxypropylmethacrylate, and hydroxybutylacrylate.

The epoxy acrylic polymer can be prepared by traditional free radical initiated polymerization techniques using suitable catalysts which include organic peroxides and azo-type compounds and chain transfer agents such as alpha-methyl styrene dimer and tertiary dodecyl mercaptan. The preparation of the epoxy copolymer as an epoxy-containing acrylic polymer may be conducted as disclosed in U.S. Pat. No. 4,650,718 (column 1, line 61 through column 3, line 40 and column 4, line 55 through column 9, line 15), incorporated herein by reference. The preparation of the epoxy acrylic polymer utilized as the single copolymer for the main film-forming polymer of the powder composition usually has amounts of the (i) and (ii) monomers in the following ranges. Preferably, this polymer has: (i) 35 to 65 percent by weight of the glycidyl functional monomer and (ii) 35 to 65 percent by weight of one or more copolymerizable ethylenically unsaturated monomers free of glycidyl functionality. Most preferably, the (ii) monomer is methylmethacrylate or trimethylcyclohexyl methacrylate. In addition the (ii) monomer can also have from about 5 to around 20 percent by weight, based on weight of the total monomers for the copolymer, of one or more additional copolymerizable monomers different from (i) and (ii) monomers, like butylmethacrylate. Although other ethylenically unsaturated monomers can be present in the epoxy acrylic polymer, the percentages by weight of the aforementioned monomers including any styrene preferably are based on the total weight of (i), and (ii) monomers, to achieve a total of 100 percent.

The Tg of the high Tg monomers mentioned above refers to the calculated value of the homopolymer made from the monomer calculated as described above by Fox. For example, the Tg of methylmethacrylate monomer is 221° F. (105° C.) and that of the styrene monomer is 212° F. (100° C.). The Tg of the copolymer from these monomers and the glycidyl-containing monomer in appropriate amounts is typically between 30° C. and 60° C., and more preferably between 35° C. and 55° C.

In addition to the aforementioned Mn, the single type of epoxy acrylic polymer preferably has a weight average molecular weight typically between about 1,000 and 5,500 and most preferably about 2000 to about 4000. Also the single type of epoxy acrylic polymer has the aforelisted epoxy content which is measured by epoxide contents can be determined by dissolving a sample in glacial acetic acid and titrating against a standard solution of (0.1N) perchloric acid in glacial acetic acid in the presence of tetraethylammonium bromide, using crystal violet as indicator. This determination is through the determination of epoxide equivalent weight in non-aqueous resins and their solutions by differential titration with perchloric acid using crystal violet as an indicator. First, the base content of the polyepoxide is obtained by potentiometric titration with perchloric acid. The mass in grams of sample containing one mole of unreacted epoxide functionality is determined by reaction of the epoxide with hydrobromic acid. The hydrobromic acid is generated in situ by the reaction of tetraethylammonium bromide with perchloric acid. A second sample of the polyepoxide is mixed with excess tetraethylammonium bromide and titrated with 0.1N perchloric acid to a green endpoint that persists for at least 30 seconds, and total epoxide and amine equivalents are calculated from these titrations, and the epoxide equivalent weight is calculated as the difference. The epoxy content is the epoxy equivalent weight divided by the molecular weight of the polyepoxide sample. Generally, the single type of epoxy acrylic polymer can have from 3.5 to 5.9 moles of glycidyl functional ethylenically unsaturated monomer per kilogram of epoxy functional copolymer, more suitably between 3.0 and 5.1 moles of glycidyl functional monomer per kilogram of epoxy copolymer.

When the predominant film-forming polymer of the powder coating is a blend of the epoxy acrylic polymers, as is preferred, the blend preferably ranges from around 25 to 75 to 75 to 25 of the two aforementioned epoxy acrylic polymers with the preferred molecular weight range and Tg range, epoxy equivalent weight and epoxy content are as shown in Table B.

TABLE B

| Mn (grams) | Tg ° C. | Epoxy Equivalent Weight | Epoxy Content |
|---|---|---|---|
| A) 1000 to 3000 | 50 to 85 (calculated) 30 to 60 (measured) | 240 to 350 | 50 |
| B) 800 to 2000 | 35 to 120 (calculated) about 0 to about 40 | 142 to 285 | 90 |

The epoxy acrylic polymers for the blend are preferably two epoxy copolymers that are prepared in a similar manner as the single epoxy acrylic polymer. The blend has a total styrene content for two or more epoxy acrylic polymers, based on the weight of the total epoxy acrylic polymers, of from 0 up to about 39 weight percent for both epoxy acrylic polymers. This means that one of the epoxy acrylic polymers in the blend may have a styrene content greater than these ranges, but when considering the lower styrene content of the other epoxy acrylic polymer in the blend and the ratios of each epoxy acrylic polymer in the blend, the blend preferably does not have a styrene content greater than the aforementioned ranges. The amounts of the (i) and (ii) monomers for one of the epoxy acrylic polymers in the blend are preferably the same as those for the single type of epoxy acrylic polymer. The other epoxy acrylic polymer in the blend has amounts of the (i) and (ii) monomers preferably in the range to result in the higher epoxy content. The amount of the (ii) monomer also assists in giving the preferred Tg and molecular weight as aforelisted in Table B.

The polyacid crosslinking agent in the film-forming resinous material is in amounts of about 10 to 90, preferably 25 to 75 percent by weight based on total weight of resin solids in the powder coating composition. The polyacid crosslinking agent has a high average acid functionality. More specifically, the polyacid crosslinking agent on average contains more than two acid groups per molecule, more preferably three or more, and most preferably four or more, such acid groups being reactive with the polyepoxide to form a crosslinked coating as indicated by its resistance to organic solvent. The parameter of greater than two acid groups per molecule is intended to encompass mixtures of polyacid crosslinking agents in which difunctional curing agents are mixed with tri- or higher functionality polyacid crosslinking agents. Polyacid crosslinking agent mixtures including up to about 50 percent of a difunctional curing agent with a trifunctional curing agent are suitable. Higher percentages of difunctional materials can be used if the remainder of the curing agent mixture is higher than trifunctional or if the polyacid crosslinking agent mixture is used with a highly functional polyepoxide component. The acid functionality is preferably carboxylic acid, although acids such as phosphorus-based acid may be used. Preferably, the polyacid crosslinking agent is a carboxylic acid terminated material having, on average, greater than two carboxylic acid groups per molecule. Among the polyacid crosslinking agents which may be used are carboxylic acid group-containing polymers such as acrylic polymers, polyesters, and polyurethanes; oligomers such as ester group-containing oligomers, which are preferred; and monomers. Suitable art-recognized polyacid crosslinking agents include those described in U.S. Pat. No. 4,650,718 (column 1, line 61 through column 3, line 40 and column 4, line 55 through column 9, line 15); U.S. Pat. No. 4,681,811 (column 1, line 63 through column 10, line 65); U.S. Pat. No. 4,703,101 (column 3, line 26 to column 6, line 5); U.S. Pat. No. 4,804,581 (Pettit et al.) (column 5, line 12 through column 7, line 34) and U.S. Pat. No. 5,407,707 (Simeone et al.) (column 3, line 50 through column 4, line 10), which are hereby incorporated by reference.

Preferably, the polycarboxylic acid is a crystalline material, more preferably a crystalline aliphatic material containing from 4 to 20 carbon atoms. Examples of suitable acids include adipic, succinic, sebacic, azelaic and dodecanedioic acid. In addition, carboxylic acid functional polyesters may be used to crosslink the powder coating composition. Low molecular weight polyesters and half-acid esters can be used which are based on the condensation of aliphatic polyols with aliphatic and/or aromatic polycarboxylic acids or anhydrides, or the reaction of aliphatic polyols and aliphatic and/or aromatic anhydrides, respectively. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol and the like. The polycarboxylic acids and anhydrides may include those mentioned above, as well as terephthalic acid, isophthalic acid, phthalic acid, phthalic anhydride, tetrahydrophthalic acid, tetrahydrophthalic anhydride, hexahydrophthalic acid, methyltetrahexahydrophthalic anhydride, alkylhexahydrophthalic anhydride, chlorendic anhydride and the like. Mixtures of the polycarboxylic acids, anhydrides, and polyols may also be used.

The use of aliphatic crystalline dicarboxylic acids is preferred, and in particular, dodecanedioic acid is most preferred. The advantage of these crystalline crosslinkers, particularly at the higher levels, is that generally they are incompatible with the epoxy functional copolymer providing for a more stable powder coating composition. However, when the powder coating composition is melted, the polyacid crosslinking agent is compatible and soluble in the acrylic copolymer acting somewhat as a diluent allowing for improved flow and appearance.

The powder coating composition is prepared by combining approximately 60 to 90 percent by weight of the epoxy copolymer with about 10 to 40 percent by weight, based on total weight of the powder coating of a polycarboxylic acid crosslinking agent. When the epoxy copolymer is in an amount in the lower portion of the aforementioned range, minor amounts of other film-forming polymers known to those skilled in the art to be useful in powder coating can be used.

Typically, a suitable range of epoxy copolymer to polycarboxylic acid crosslinking agent can be between 70 to 85, more preferably 70 to 80 percent by weight epoxy copolymer and between 15 to 30, more preferably 20 to 30 percent by weight polycarboxylic acid crosslinking agent, based on total weight of the powder coating. Also it is preferred that the equivalent ratio of the reactants present in the powder composition of the present invention is adjusted such that for each equivalent of epoxy there are around 0.3 to around 3.0, preferably 0.75 to 1.5 equivalents of carboxyl (anhydride, if present, is considered monofunctional).

The powder coating composition may also contain additional materials as known to those skilled in the art. For example, an anhydride for improved cure response and copolymer of an alpha olefin and olefinically unsaturated anhydride for improved humidity resistance of the cured coating can be used.

Additionally, polymer or copolymer flow control or flow modifying agents known to those skilled in the art can be used in the powder coating of the present invention. Suitable examples and amounts are shown in U.S. Pat. No. 5,212,245 (columns 2–4). Also commercially available flow control polymers and copolymers can be used such as Modaflow (or Resiflow) flow additives, available from Monsanto Chemical Company of St. Louis, Mo. and the like. Generally, the weight average molecular weight of the copolymer flow control agents can range from about 1000 to 40,000, preferably 1000 to 15,000. Generally, the glass transition temperature (Tg) of the copolymer is less than 10° C. and preferably less than 0° C. and most preferably in the range of −60° C. to −10° C. The Tg can be calculated and measured in the aforedescribed manner. The Tg of the copolymer is not limiting of its performance as a flow additive but Tg's greater than 10° C. are not preferred because of decreased flow on coating application. A suitable amount of the flow control agent can be in the range of from about 0.01 to about 10 percent by weight based on total resin solids for the curable powder composition. With the preferred powder coating, the weight percent is of the total resins of the particulate film-forming polymer and flow modifier. Preferably, the flow control copolymer will be included in the powder coating composition in amounts of 0.1 to 3 percent by weight, more preferably from about 0.5 to about 2 percent by weight for clear coat applications. The preferred flow modifier is that from Troy as shown in the examples.

The thermosetting powder coating compositions of the invention can optionally include other materials such as pigments, fillers, light stabilizers and antioxidants such as those shown in U.S. Pat. No. 5,407,707, hereby incorporated by reference. Nonexclusive examples of light stabilizers include those shown in the Examples herein and others such as CGL 1545 hydroxyphenyl triazine ultraviolet absorber available from Ciba-Geigy Limited, Basel, Switzerland.

Anti-popping agents can be added to the composition to allow any volatile material to escape from the film during baking. Benzoin is a commonly preferred anti-popping agent useful in an effective amount to retard popping of the coating. When used, benzoin is generally present in amounts of from about 0.5 to 3.0 percent by weight based on total weight of the powder coating composition.

In addition, the powder coating composition may include fumed silica or the like to reduce caking of the powder during storage. An example of a fumed silica is sold by Cabot Corporation under the trademark CAB-O-SIL. The fumed silica is present in amounts ranging from 0.1 to 1 percent by weight based on total weight of the powder coating formulation.

The thermosetting powder coating compositions are prepared by melt blending the ingredients. This can be accomplished by first blending the ingredients in a high shear mixer, such as a planetary mixture, and then melt blending in an extruder from about 80° C. to about 130° C. The extrudate is then cooled and pulverized into a particulate blend. Such a particulate mixture can be applied preferably by spraying techniques. The thermosetting powder coating compositions of the invention can be applied as clearcoats in color-plus-clear or basecoat, clearcoat composite coatings.

The waterborne base coat of the multilayered composite coating having the powder clear coat has a film-forming composition that can be the film-forming polymers and copolymers such as acrylic polymers, polyesters, including alkyds, and polyurethanes and blends and mixtures thereof. The waterborne base coat also has one or more crosslinking agents for the film-forming resin and one or more pigments to act as the colorant.

Suitable examples of film-forming polymers and copolymers for the base coat compositions include acrylic polymers or oligomers such as copolymers of one or more alkyl esters of acrylic acid or methacrylic acid, and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate, and 2-ethylhexyl acrylate. Suitable other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. The acrylic polymers or oligomers may contain hydroxyl functionality which can be incorporated into the acrylic polymer or oligomer through the use of hydroxyl functional monomers such as hydroxyethyl acrylate, hydroxypropyl acrylate, hydroxyethyl methacrylate, and hydroxypropyl methacrylate which may be copolymerized with the other acrylic monomers.

The acrylic polymer or oligomer may be prepared by solution polymerization techniques in the presence of suitable initiators such as organic peroxides or azo compounds, for example, benzoyl peroxide or N,N-azobis (isobutyronitrile). The polymerization may be carried out in an organic solution in which the monomers are soluble by techniques conventional in the art. Other polymerization techniques which may be used to prepare the acrylic polymer or oligomer include emulsion polymerization or suspension polymerization.

The acrylic polymer or oligomer typically has a number average molecular weight of from about 1000 to 10,000, preferably from about 1000 to 5000 as determined by gel permeation chromatography using a polystyrene standard and has a carbamate equivalent weight less than about 2000, preferably within the range of about 140 to 800, based on equivalents of reactive carbamate groups. The equivalent weight is a calculated value based on the relative amounts of the various ingredients used in making the acrylic material and is based on solids of the acrylic polymer or oligomer.

Linear or branched polyesters may also be used in the formulation of the film-forming composition and may be prepared by the polyesterification of a polycarboxylic acid or anhydride thereof with polyols and/or an epoxide. Usually, the polycarboxylic acids and polyols are aliphatic or aromatic dibasic acids and diols. Transesterification of polycarboxylic acid esters is also possible.

The polyols which are usually employed in making the polyester include dihydric alcohols such as ethylene glycol, neopentyl glycol, 1,6-hexanediol, 2,2-dimethyl-3-hydroxypropyl-2,2-dimethyl-3-hydroxypropionate, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxyalkylated bisphenols, polyether glycols, for example, poly (oxytetramethylene) glycol and the like. Polyols of higher functionality may also be used. Examples include trimethylolpropane, trimethylolethane, pentaerythritol and the like.

The acid component of the polyester consists primarily of monomeric carboxylic acids or anhydrides thereof having 2 to 18 carbon atoms per molecule. Among the acids which are useful are cycloaliphatic acids and anhydrides such as phthalic acid, isophthalic acid, terephthalic acid, tetrahydrophthalic acid, hexahydrophthalic acid, methylhexahydrophthalic acid, 1,3-cyclohexane dicarboxylic acid, and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. Lower alkyl diacids, that is, acids having less than about 10 carbon atoms such as adipic acid, are preferred. The polyester may include minor amounts of monobasic acids such as benzoic acid, stearic acid, acetic acid, and oleic acid. Also, there may be employed higher carboxylic acids such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate may be used.

The polyester polymer or oligomer typically has a number average molecular weight of from about 300 to 10,000, preferably from about 300 to 3000 as determined by gel permeation chromatography using a polystyrene standard.

The polyester polymer or oligomer, when present in the film-forming composition, is used in amounts of about 20 to 75, preferably about 20 to 65 percent by weight based on the total weight of resin solids in the film-forming composition.

When a mixture of acrylic and polyester polymers or oligomers is used in the film-forming composition, the total amount of the mixture present in the film-forming composition is about 20 to 75 percent by weight, based on the total weight of resin solids in the film-forming composition. The ratio of the acrylic to polyester polymers or oligomers in the mixture preferably is in the range of about 70:30 to about 40:60.

Suitable curing agents for such film-forming polymers of the base coat can be aminoplast crosslinking agent containing methylol and/or methylol ether groups. Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, and hexanol.

Preferably, the aminoplasts which are used are melamine-, urea-, or benzoguanamine-formaldehyde condensates etherified with an alcohol containing from one to four carbon atoms. The aminoplast is present in amounts of about 25 to 50, preferably about 30 to 45 percent by weight based on the total weight of resin solids in the film-forming composition.

Suitable waterborne base coat compositions may be those disclosed in U.S. Pat. No. 4,403,003 and European Patent Nos. 0038127, 0206615, 0502934, 0260447, 0281936, 0228003 and 0355433 and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat. Additional examples of such base coats include those solvent borne and waterborne film-forming resinous materials that include one or more pigments such as those available from PPG Industries Inc., Pittsburgh, Pa., U.S.A.

The base coat contains pigments to give it color. Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica.

Besides the metallic pigments, the base coating compositions of the present invention may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight based on weight of coating solids.

Usually, the film-forming composition will also preferably contain catalysts to accelerate the cure of the crosslinkable film former and crosslinking agent like aminoplasts. Examples of suitable catalysts are acidic materials and include acid phosphates and sulfonic acid or a substituted sulfonic acid such as dodecylbenzene sulfonic acid or para-toluene sulfonic acid. The catalyst is usually present in an amount of about 0.5 to 5.0 percent by weight, preferably about 0.5 to 2 percent by weight, based on the total weight of resin solids in the film-forming composition. Optional ingredients such as, for example, plasticizers, surfactants, thixotropic agents, fillers, anti-gassing agents, organic cosolvents, flow controllers, anti-oxidants, UV light absorbers and similar additives conventional in the art may be included in the composition. These ingredients are typically present at up to 40 percent by weight based on total resin solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

The base coating compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used. During application of the base coat composition to the substrate, a film of the base coat is formed on the substrate. The base coat film thickness will be about 0.1 to 3 mils (2.54 to 76.2 microns), preferably 0.1 to 2 mils (2.54 to 50.8 microns) and most preferably 5 to 30 microns in thickness.

After application of the base coat to the substrate, a film is formed on the surface of the substrate by driving solvent, i.e., organic solvent or water, out of the base coat film by heating or by an air drying period. Preferably, the heating will only be for a short period of time, sufficient to ensure that the clear coat can be applied to the base coat without the former dissolving the base coat composition, yet insufficient to fully cure the basecoat. Suitable drying conditions will depend on the particular waterborne base coat composition, and on the ambient humidity with certain waterborne compositions, but in general a drying time of from about 1 to 15 minutes at a temperature of about 80° F. to 250° F. (20° F. to 121° C.) is adequate. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed; that is, exposed to ambient conditions for about 1 to 20 minutes.

Application of the powder coating of the present invention can be by spraying, and in the case of a metal substrate, by electrostatic spraying which is preferred, or by the use of a fluidized bed. The powder coating can be applied in a single sweep or in several passes to provide a film having a thickness after cure of from 1 to 15, preferably 1 to 6 mils (25.4 to 381 usually 25.4 to 152 microns). After application of the coating composition such as the preferred powder coating, the powder coating substrate is baked at a temperature sufficient to cure the coating, typically at about 250° F. to about 400° F. (121° C. to 204° C.) for about 1 to 60 minutes, and preferably at about 275° F. to 350° F. (135° C. to 177° C.) for about 10 to 30 minutes.

While the powder coating composition can be applied directly upon bare metal, that is, upon untreated, unprimed steel or upon pretreated, i.e., phosphatized unprimed steel, in one embodiment of the invention the powder coating composition is applied to a metal substrate having a thin layer of electrodeposited primer coating. The electrodeposited primer coating upon the metal substrate can be, for example, a cathodic electrodeposition primer composition such as those available from PPG Industries, Inc. under the UNI-PRIME trademark. In one aspect of the present invention, it is contemplated that the powder coating composition can be applied directly upon at least a portion of an uncured electrodeposited primer coating, for example, the electrodeposited primer coating deposited over an automotive or truck body and thereafter both the electrodeposited primer coating and powder coating as a primer coating can be co-cured by heating at a temperature between 275° F. to 350° F. (135° C. to 177° C.) for about 10 to 30 minutes.

As another aspect of the present invention, the aforementioned powder coating with the epoxy acrylic polymer as a single predominant film-forming polymer or as the blend of epoxy acrylic polymers is the clear unpigmented, or only slightly pigmented without interfering pigments, clear coat in a multilayered coating composite on substrates like those mentioned above. The multilayered coating composite can have one or more primer coats which can be any primer coating known to those skilled in the art and the waterborne basecoat for a basecoat plus clearcoat composite. For instance, the primer coat can be an electrodeposited primer coat of a cationic epoxy amine adduct cured with a polyisocyanate curing agent alone or with solvent borne primers.

The basecoat is applied to the cured primer coating to give a film thickness in the range of 10 to 20 microns.

EXAMPLES

The following examples show the preparation of powder coating compositions and polymers utilized in the thermosetting powder coating compositions of the present invention. All of the amounts are in parts by weight as grams of the actual component used in preparing the powder coating formulation.

Polymer Synthesis Examples

Examples A through I show the preparation of various polymer compositions, differing in styrene content, Tg (high and low) and molecular weight (Mw), which were used to prepare powder coating compositions of the present invention shown below in Examples 1 through 12.

Examples A–I

The ingredients of Examples A through I are listed below in Table I. The polymers of each example were prepared using the following procedure.

An initial solvent portion was charged into a four-neck flask, which served as the reaction vessel, and which was equipped with a thermocouple, a reflux condenser and a stirrer. The initial solvent charge was heated to reflux under a nitrogen gas blanket. A "first initiator mixture" is prepared in a separate premix flask. Also, the monomer mixture is prepared in a separate second premix flask. The first initiator mixture and the monomer mixture are simultaneously added dropwise from separate addition funnels into the reaction vessel over a period of time of three hours while maintaining the reaction at reflux and under a nitrogen gas blanket. After the completion of the additions, the reaction mixture was held at reflux for 30 minutes. After this period of time, a "second initiator mixture", which is premixed, was added by the addition funnel to the reaction vessel and the reaction was then held at reflux under the nitrogen blanket for one hour. After this period of time, a "third initiator mixture", which was premixed, is added by the addition funnel to the reaction vessel and the reaction was then held at reflux under the nitrogen blanket for one hour after which the reaction mixture was cooled. The reaction mixture was then vacuum stripped to remove volatile components. The reaction mixture was analyzed for solids content, and weight average molecular weight as determined by gel permeation chromatography using a polystyrene standard.

TABLE I

| Ingredients | A | B | C | D | E | F | G | H | I |
|---|---|---|---|---|---|---|---|---|---|
| Initial Charge: | | | | | | | | | |
| Xylene | 502.2 | 500.3 | 500.3 | 0 | 0 | 1093.5 | 1447.8 | 482.6 | 482.6 |
| Butyl acetate | 0 | 0 | 0 | 1093.5 | 1093.5 | 0 | 0 | 0 | 0 |
| Monomer Mixture: | | | | | | | | | |
| Glycidyl methacrylate | 1050 | 1045.7 | 1045.7 | 2300 | 2300 | 2300 | 3632.4 | 1210.8 | 1210.8 |
| Butyl methacrylate | 105 | 209.1 | 104.6 | 460 | 460 | 460 | 0 | 0 | 0 |
| Methyl methacrylate | 630 | 732.0 | 732.0 | 1610 | 1610 | 1610 | 0 | 0 | 0 |
| Styrene | 315 | 104.6 | 209.1 | 230 | 230 | 230 | 0 | 0 | 201.8 |
| Butyl acrylate | 0 | 0 | 0 | 0 | 0 | 0 | 0 | 0 | 201.8 |
| Trimethylcyclohexyl methacrylate | 0 | 0 | 0 | 0 | 0 | 0 | 2421.6 | 807.2 | 403.6 |
| First Initiator Mixture: | | | | | | | | | |
| Xylene | 360 | 359.1 | 359.1 | 0 | 0 | 790.1 | 1039.2 | 346.4 | 346.4 |
| Butyl acetate | 0 | 0 | 0 | 790.1 | 790.1 | 0 | 0 | 0 | 0 |
| Lupersol 555[1] | 181 | 209.1 | 209.1 | 460 | 230 | 613.3 | 0 | 0 | 0 |
| Vazo-67[2] | 0 | 0 | 0 | 0 | 0 | 0 | 302.4 | 100.8 | 100.8 |
| Second Initiator Mixture: | | | | | | | | | |
| Xylene | 18.9 | 18.7 | 18.7 | 0 | 0 | 40.7 | 54 | 18 | 18 |
| Butyl acetate | 0 | 0 | 0 | 40.7 | 40.7 | 0 | 0 | 0 | 0 |
| Lupersol 555 | 14.5 | 14.0 | 14.0 | 30.7 | 30.7 | 30.7 | 0 | 0 | 0 |
| Vazo-67 | 0 | 0 | 0 | 0 | 0 | 0 | 24.6 | 8.2 | 8.2 |
| Third Initiator Mixture: | | | | | | | | | |
| Xylene | 18.9 | 18.7 | 18.7 | 0 | 0 | 40.7 | 54 | 18 | 18 |
| Butyl acetate | 0 | 0 | 0 | 40.7 | 40.7 | 0 | 0 | 0 | 0 |
| Lupersol 555 | 14.5 | 14.0 | 14.0 | 30.7 | 30.7 | 30.7 | 0 | 0 | 0 |
| Vazo-67 | 0 | 0 | 0 | 0 | 0 | 0 | 24.6 | 8.2 | 8.2 |
| % Styrene (on monomers) | 15 | 5 | 10 | 5 | 5 | 5 | 0 | 0 | 10 |
| Mw | 4530 | 4264 | 3757 | 5446 | 10,505 | — | — | 4479 | 4657 |
| Mn | 1700 | 1600 | 1500 | 1900 | 2400 | 1300 | 2000 | 2300 | 1800 |
| Tg in degrees C. | 43 | 36 | 35 | 40 | 51 | 29 | 34 | 52 | 30 |

[1] t-Amyl peroxyacetate commercially available from Elf Atochem North America, Inc.
[2] 2,2'-Azobis(2-methylbutyronitrile), available from E. I. DuPont de Nemours and Co.

Powder Coating Composition Examples

Each formulation in the examples below in Tables II and III are shown in amounts of parts by weight which are the grams of the actual component used in the formulation and each formulation was processed in the following manner. The components were blended in a Henschel Blender for 30 to 60 seconds. The mixtures were then extruded through a Werner & Pfleider co-rotating twin screw extruder at a temperature of 100° C. to 130° C. The extruded material was then ground and classified to a particle size of 17 to 27 microns using and ACM1 Grinder (Air Classifying Mill from Micron Powder Systems, Summit, N.J.). The finished powders were electrostatically sprayed onto test panels and evaluated for appearance and chip resistance. The results are tabulated below in Table IV.

Examples 1 through 12 show powder coating compositions of the present invention. Examples 1 and 3 show powder compositions with a variation in styrene content of the polymer while holding polymer Mw approximately constant (Example 1: 15% styrene content, 4530 Mw; Example 2: 5% styrene, 4264 Mw; and Example 3: 10% styrene, 3757 Mw). Examples 2, 4 and 5 show powder compositions with a constant polymer composition (50% glycidyl methacrylate, 5% styrene, 10% butyl methacrylate, 35% methyl methacrylate) and varying Mw (Example 2: 4264 Mw; Example 4: 5446 Mw; and Example 5: 10,505 Mw). The Mw of Example 5 is outside the scope of this invention and is considered a comparative example. Examples 6 through 10 show powder compositions made from blends of polymers having varying Mw and Tg.

TABLE III

| Ingredient | 11 | 12 |
|---|---|---|
| Polymer of Example H | 501.5 | 334.3 |
| Polymer of Example I | 167.2 | 334.3 |
| DDDA | 246.3 | 246.3 |
| Benzoin | 7.0 | 7.0 |
| TINUVIN 144[1] | 20.0 | 20.0 |
| TINUVIN 900 | 20.0 | 20.0 |
| GCA-1 | 20.0 | 20.0 |
| Liquid Modaflow[2] | 8.0 | 8.0 |
| Methyl dicocoamine | 2.5 | 2.5 |
| Triphenyl Tin Hydroxide[3] | 7.5 | 7.5 |

[1]TINUVIN 144 (2-tert-butyl-2-(4-hydroxy-3,5-di-tert-butylbenzyl)[bis (methyl-2,2,6,6,-tetramethyl-4-piperidinyl)]dipropionate), an ultraviolet light stabilizer available from Ciba-Geigy Corp.
[2]Modaflow, flow control additive, commercially available from Monsanto.
[3]Commercially available from Elf Atochem North America.

The clear coat compositions of Examples 1 through 12 were prepared for testing as follows. For Monochip testing, test panels coated with electrocoat primer, commercially available from PPG Industries, Inc. as ED-5000, were first primed to a film thickness of about 0.7 to 1.3 mils (18 to 33$\mu$) with an automotive solvent-borne black primer commercially available from Mehnert & Veek, Germany, then baked for 20 minutes at 320° F. The test panels were then basecoated, by spray application to a film thickness of about 0.6 mils (15.2$\mu$), with an oxford green waterborne base coat, commercially available from BASF, Germany. The basecoated panels were then flash baked for 10 minutes at 176° F. (80° C.) before electrostatically spray applying each powder clear coat composition of Examples 1 to 12. The powder coated panels were then cured for 30 minutes at 285°

TABLE II

| Ingredient | 1 | 2 | 3 | 4 | 5 | 6 | 7 | 8 | 9 | 10 |
|---|---|---|---|---|---|---|---|---|---|---|
| Polymer of Example A | 717.4 | 0 | 0 | 0 | 0 | 0 | 0 | 0 | 0 | 0 |
| Polymer of Example B | 0 | 717.4 | 0 | 0 | 0 | 538.0 | 0 | 0 | 0 | 217.4 |
| Polymer of Example C | 0 | 0 | 717.4 | 0 | 0 | 0 | 0 | 0 | 0 | 0 |
| Polymer of Example D | 0 | 0 | 0 | 717.4 | 0 | 0 | 0 | 0 | 0 | 0 |
| Polymer of Example E | 0 | 0 | 0 | 0 | 717.4 | 0 | 0 | 0 | 0 | 0 |
| Polymer of Example F | 0 | 0 | 0 | 0 | 0 | 179.3 | 226.4 | 226.0 | 208.2 | 0 |
| Polymer of Example G | 0 | 0 | 0 | 0 | 0 | 0 | 0 | 0 | 624.7 | 0 |
| PD-9060[1] | 0 | 0 | 0 | 0 | 0 | 0 | 0 | 677.8 | 0 | 0 |
| PD-3402[1] | 0 | 0 | 0 | 0 | 0 | 0 | 679.2 | 0 | 0 | 652.9 |
| VXL-1381[3] | 0 | 0 | 0 | 0 | 0 | 0 | 0 | 0 | 0 | 258.6 |
| DDDA[4] | 282.6 | 282.6 | 282.6 | 282.6 | 282.6 | 282.7 | 294.4 | 296.4 | 367.1 | 70.8 |
| EX 570[5] | 13.2 | 13.2 | 13.2 | 13.2 | 13.2 | 13.6 | 15.8 | 15.8 | 15.8 | 15.6 |
| Benzoin | 2.2 | 2.2 | 2.2 | 2.2 | 2.2 | 2.2 | 2.6 | 2.6 | 2.6 | 2.6 |
| Wax C[6] | 6.6 | 6.6 | 6.6 | 6.6 | 6.6 | 6.6 | 7.9 | 7.9 | 7.9 | 7.8 |
| PR-31[7] | 22.0 | 22.0 | 22.0 | 22.0 | 22.0 | 22.0 | 26.4 | 26.4 | 26.4 | 26.0 |
| TINUVIN 900[8] | 22.0 | 22.0 | 22.0 | 22.0 | 22.0 | 22.0 | 26.4 | 26.4 | 26.4 | 26.0 |
| GCA-1[9] | 22.0 | 22.0 | 22.0 | 22.0 | 22.0 | 22.0 | 26.4 | 26.4 | 26.4 | 26.0 |
| Methyl dicocoamine | 11.0 | 11.0 | 11.0 | 11.0 | 11.0 | 11.0 | 13.2 | 13.2 | 13.2 | 0 |

[1]PD 9060, glycidyl containing polymer having a Tg of 44° C., commercially available from Anderson Development, Inc. made in accordance with U.S. Pat. No. 4,042,645.
[2]PD 3402, glycidyl containing polymer having a Tg of 52° C., commercially available from Anderson Development, Inc.
[3]ADDITOL VXL 1381 anhydride crosslinker commercially available from Hoechst-Celanese.
[4]Dodecanedioic Acid.
[5]TROY EX 570, amide modified polyester oligomer commercially available from TROY Corporation.
[6]Wax C Micro Powder, a fatty acid amide (ethylene bis-stearoylamide), commercially available from Hoechst-Celanese.
[7]Sanduvor PR-31 Powder, hindered amine light stabilizer containing propanedioic acid, [(4-methoxyphenyl)-methylene]-,bis(1,2,2,6,6-pentamethyl-4-piperdivinyl)ester, commercially available from Clariant Corporation.
[8]TINUVIN 900 (2-(3',5'-bis(1-methyl-1-phenylethyl)-2'-hydroxyphenyl)benzotriazole), an ultraviolet light stabilizer available from Ciba-Geigy Corp.
[9]GCA-1, an anti-yellowing agent commercially available from Sanko Chemical Corp.

F. (140° C.). The dry film thickness (DFT) of the powder clear was targeted for 2.3 to 3.5 mils (58 to 89μ).

For appearance evaluations, each powder was electrostatically sprayed to a film thickness of 2.3 to 3.5 mils directly onto test panels coated with a smooth black electrocoat paint, commercially available from PPG Industries, Inc. as ED5051, and then cured for 30 minutes at 285° F. (140° C.). The test panels were then tested for chip resistance using the Monochip test described below, and appearance using 20° gloss, haze, and DOI as criteria. The results are tabulated in Table IV.

TABLE IV

| EXAMPLE | MONOCHIP** | | | | Appearance | | |
|---|---|---|---|---|---|---|---|
| | Initial | | −20° C. | | Over Black ED 5051 | | |
| | mm | Mode | mm | Mode | 20° Gloss* | Haze* | DOI* |
| 1 | Ac | C | VG | A | 96 | 18 | 93 |
| 2 | G | C | VG | C | 83 | 24 | 97 |
| 3 | Ac | C | VG | C | 84 | 18 | 97 |
| 4 | VG | M | M | A | 84 | 22 | 92 |
| 5 | G | M | M | A | 83 | 31 | 85 |
| 6 | M | C | VG | A | 86 | 17 | 90 |
| 7 | Ac | C | G | C | 86 | 13 | 89 |
| 8 | Ac | C | VG | A | 86 | 18 | 93 |
| 9 | M | C | VG | A | 83 | 22 | 88 |
| 10 | M | C | VG | M | 88 | 18 | 93 |
| 11 | M | C | — | — | 81 | 19 | 97 |
| 12 | M | C | — | — | 79 | 25 | 96 |

*Appearance Properties: 20° Gloss and Haze were measured by a BYK Gardner Haze-Gloss Meter. Higher numbers for gloss indicate better performance and lower numbers for Haze indicate better performance. Haze numbers over 30 are considered unacceptable. Distinction of Image (DOI) was measured by a Hunter Lab's Dorigon II where higher numbers indicate better performance.
**Monochip Test: The test panels were chipped with the use of a Byk-Gardner Mono-chip Tester. This machine uses an air driven piston to impact the test panel with a small steel mallet shaped like a screw-driver head. The pressure used was 43 psi (3 bar). Three impacts were run at ambient conditions, then the test panel was placed in a freezer at −20° C. and allowed to equilibrate. Within one minute after removing the test panel from the freezer, the panel was impacted three more times in the Byk-Gardner Mono-chip Tester. Next the panels were tape tested by covering the impact zone of the panel with Tesa 4651 tape from Beiersdorf AG, Hamburg, Germany, and then removing the tape from the test panel in one rapid pull. The "Mode" of failure or loss of adhesion of the coating after tape testing is designated "C" for cohesive failure when impact damage is within a layer of coating, "A" for adhesive failure when the impact damage is between layers of coating, and "M" for mixed adhesive and cohesive failures. A cohesive failure mode is preferred over an adhesive failure mode. The rating is the average width of paint loss from the impact areas where lower widths indicate better results and where VG is very good, G is good, M is marginal, and Ac is acceptable.

Comparative Example I and Example 13

Two powder clear coat compositions were prepared from the components of Table V below.

TABLE V

| | Examples (Weight Percent) | |
|---|---|---|
| Ingredient | Comparative Example | 13 |
| Polymer of Example B from Table I | — | 69.14 |
| Polymer of PD9060 | 69.8 | — |
| DDDA | 21.47 | 22.69 |
| Benzoin | 0.2 | 0.2 |
| TINUVIN 144[1] | 2 | 2 |

TABLE V-continued

| | Examples (Weight Percent) | |
|---|---|---|
| Ingredient | Comparative Example | 13 |
| TINUVIN 900 | 2 | 2 |
| GCA-1 | 2 | 2 |
| Flow Additive[2] | 0.97 | 1.1 |
| Wax C | 0.6 | 0.6 |
| Methyl dicocoamine | 1 | 0.37 |
| CGL 1545[3] | — | 7.5 |

[1]TINUVIN 144 (2-tert-butyl-2-(4-hydroxy-3,5-di-tert-butylbenzyl)[bis (methyl-2,2,6,6,-tetramethyl-4-piperidinyl)]dipropionate), an ultraviolet light stabilizer available from Ciba-Geigy Corp.
[2]Flow control additive made in accordance with the procedure and components as shown in Patent Cooperation Treaty Patent Application PCT/US97/02067, particularly Example 1, which was recently published.
[3]Commercially available from Ciba Giegy.

Multilayered composite coatings on panels had the powder coating composition of either Example 13 or Comparative Example I. These panels were prepared with a multilayered composite coating in a manner similar to those for Examples 1 through 12 wherein in addition to the E-Coat primer, a second primer was used. This primer was that commercially available automotive solvent-borne black primer from Mehnert & Veek, Germany, which was cured by baking for 20 minutes at 320° F. Both the E-Coat primer and the second primer were cured separately after their respective applications. To the cured second primer, a waterborne basecoat was applied to give a film thickness of 18 to 20 microns. The waterborne base coat was a commercially available oxford green basecoat from BASF Lacke + Farben AG, Munster, Germany. The powder coatings of the Comparative Example I and Example 13 were applied to their respective test panels to give film thicknesses of around 60 microns. The film thicknesses of the coatings in the multilayered coatings were as follows:

| Panels with Multilayered Coatings with the Indicated Powder Clear Coat having Film Thicknesses per Layer | | |
|---|---|---|
| Coating layer | Comparative Example I | Example 13 |
| E-Coat | 33.3 microns (u) | 31.4 u |
| Second Primer | 39.5 u | 38.3 u |
| Basecoat | 18 u | 19.8 u |
| Powder Clearcoat | 63.4 u | 60.2 u |

Qualitative migration studies were conducted on these panels with the multiple layered coatings with Infrared Spectroscopy in the below-described manner.

Samples were prepared by Microtome wedge cutting. This was performed by gluing a 2.5×5.0 cm panel section coated with the multilayered composite coating to a solid acrylic block for support to prepare a sample. A cyanoacrylate bonding adhesive is used to adhere the panel to the acrylic support. The acrylic supports are approximately 4×4×1.5 cm in dimension. The prepared samples are mounted/aligned on the microtome stage so that the cutting blade is flush to both the front and back edges of the coated panel. By slightly tilting the front edge away from the cutting blade, the sample is positioned properly for wedge cutting.

After the sample is properly mounted and aligned, microtome thin sections of 3 micron thickness of the coating from the panel section are obtained. By cutting a shallow angle through the coating system, sampling areas can be increased 500 times or greater. Thin sections containing all of the individual coating layers from the multilayered composite coatings were collected.

Infrared Depth Profiling by Transmission FTIR microscopy was performed on the thin sections from the aforedescribed microtome wedge cutting technique. These transmission experiments are performed by placing a microtome thin section on the IR microscope stage and focusing the beam through a given area of interest.

Initially, a single spectrum is collected on the clearcoat surface of the wedge section. Either fixed or variable apertures can be used to define the analysis area as long as sufficient energy is available for sample detection. Collected spectra are referenced to air. Advancement through the multilayer coating system is achieved by moving the stage in equivalent increments toward the electrocoat ("E-Coat") primer layer. To maintain control over analysis depth, care is taken to move the stage in a straight line across the coating system. This minimizes variations in coating width that is inherent to the cutting process. Typically, several spectra are obtained in each of the coating layers (clear coat; base coat; primer; and E-Coat primer) if the wedge cut is sufficiently shallow.

Spectra obtained by transmission FTIR microscopy are compared to control spectra that are free of any migrational components. Control spectra are prepared by analyzing individual coating free films.

Figure 1:
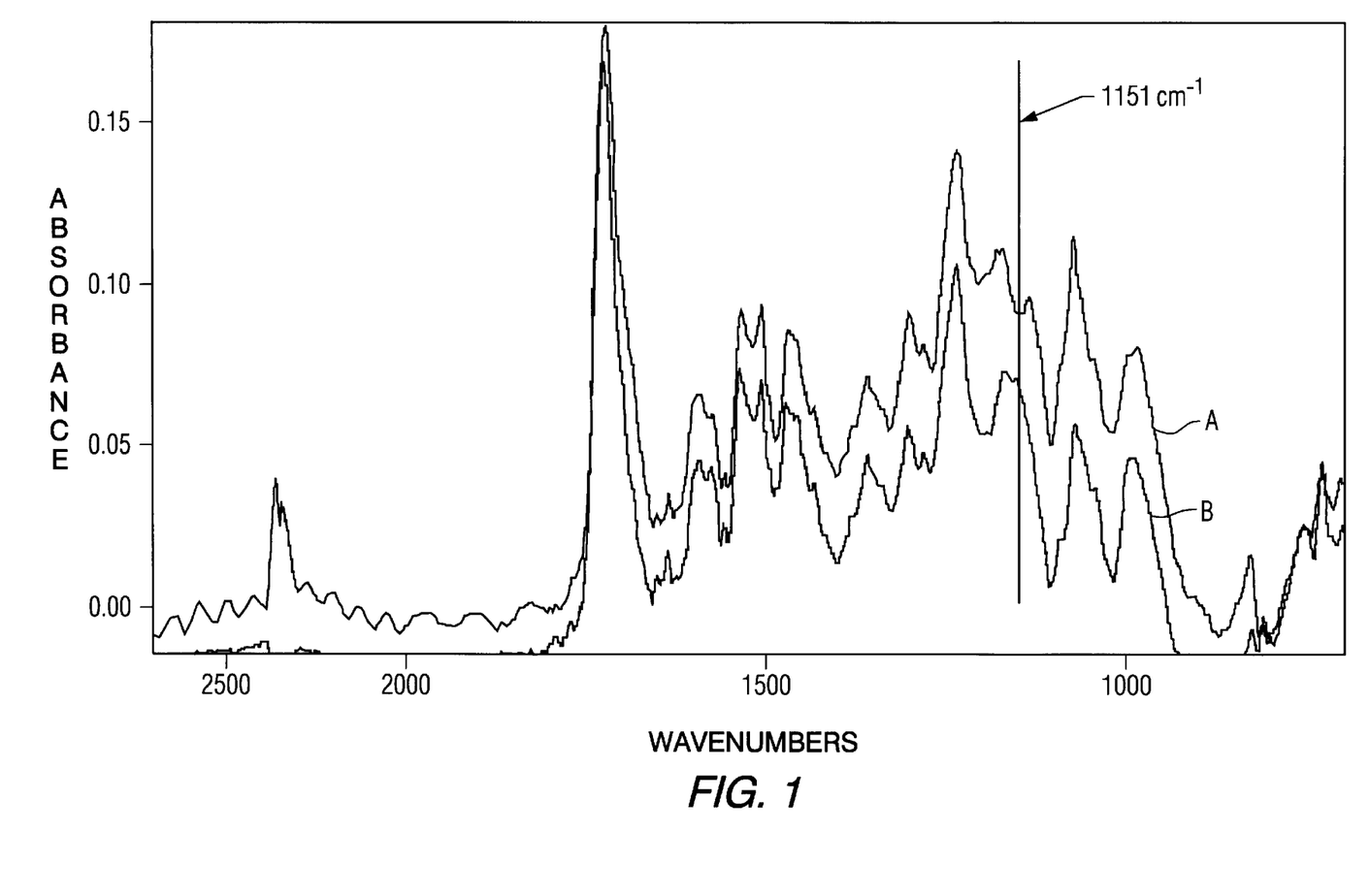
FIG. 1 is a graph of two infrared spectroscopy curves superimposed one on the other indicating qualitatively the absence in Curve A and the presence in Curve B of a peak for acrylic at 1151 cm$^{-1}$ at the same bottom level of the basecoat for a composite coating according to the present invention, Curve B and a composite coating outside the scope of the invention, Curve A. Curve A is for a prior art powder clear coat and waterborne base coat composite coating and Curve B is for a powder clear coat and waterborne base coat composite coating according to the present invention.

Evidence of coating migration required to provide improved chip performance is observed by the detection of film forming polymeric component of the clearcoat in the underlying basecoat and/or basecoat/primer interface regions. The wavelength of approximately 1150 cm$^{-1}$ C—O—C stretch bands region of the infrared spectra was monitored for this purpose for the acrylic film-forming polymer. The results are shown in FIG. 1 for the multilayered coating of Comparative Example I as Curve A and Example 13 as Curve B.

The infrared depth profiling data that were generated show that based upon chip performance, Example 13 with the Example B epoxy acrylic polymer gave the best migration effect. Curve B shows from the shoulder on the downward slope of the peak at 1151 cm$^{-1}$ the presence of acrylic polymer. Curve A for the multilayered composite coating with the powder clear coat of Comparative Example I shows no peak at 1151 cm$^{-1}$. The depth of the basecoat layer for which Curves A and B were measured was the same.

Data generated from this IR analysis clearly show evidence of clearcoat components throughout the underlying Oxford green basecoat layer in multilayered composite coatings using the clear coat of Example 13. The amount of clearcoat detected decreases at increased depths within the basecoat layer. Clear coat formulated like that of Comparative Example I does not show evidence of migration by infrared analysis beyond the upper few microns of the basecoat layer.

In addition to the qualitative IR tests, additional qualitative tests were performed on similar panels with the multilayered composite coatings of the Comparative Example I and Example 13. The sample preparation was similar except the thicknesses of the microtome thin sections were 2 microns rather than 3 microns. Also the sections were a collection of successive parallel slices rather than a single wedge slice.

These slices were analyzed by Pyrolysis Gas Chromatography and Mass Spectrometry (PGC/MS) for selected clear coat components to determine migration of these components. For the technique to work, the component being followed should be unique to the clear coat and should have stable thermal chemical properties. For this study, the acrylic migration was followed by monitoring a component of the acrylic, in this case n-butyl methacrylate (BMA) and glycidyl methacrylate (GMA).

The collection of Microtome slices produced as described previously were placed individually into quartz pyrolysis tubes and were pyrolyzed for 10 seconds at 800° C. The resulting volatile pyrolysis products were analyzed using gas chromatography mass spectrometry. The migration of the acrylic was determined by plotting the MS signal for BMA and GMA as a function of coating depth.

Figure 2:
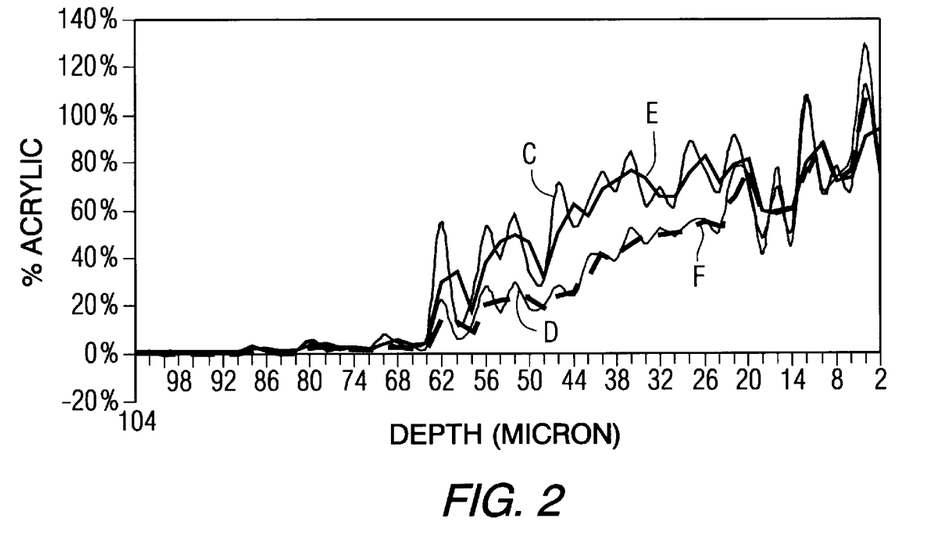
FIG. 2 is a graph of the weight percentages of acrylic as butylmethacrylate, Curve C, and glycidyl methacrylate, Curve D, at the depths of the composite coating shown on the horizontal axis for a prior art powder clear coat and waterborne base coat composite coating. Curves E and F are the curves for the moving average for Curves C and D, respectively. The moving average was determined by averaging every two points.
Figure 3:
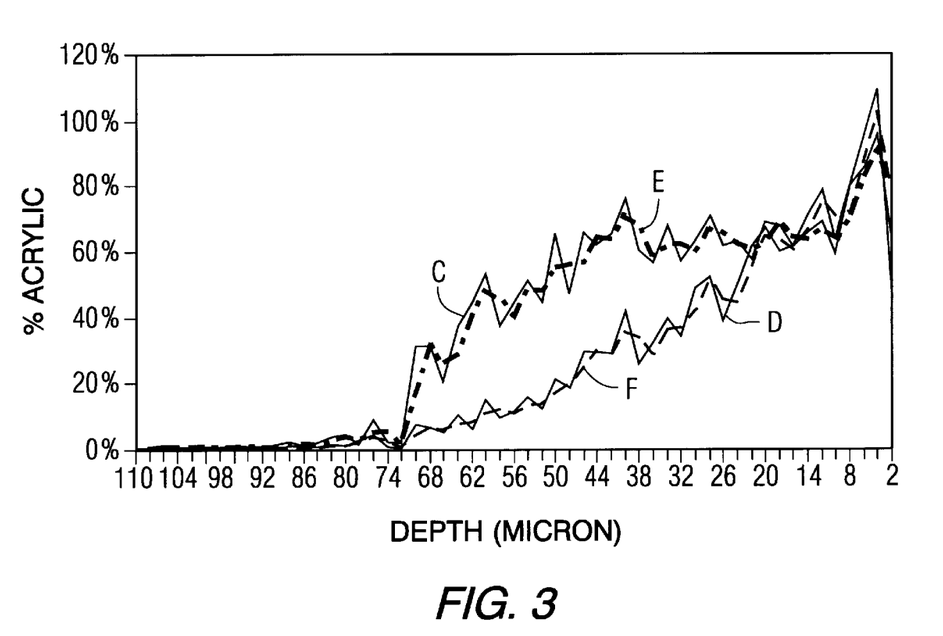
FIG. 3 is a graph of the percentage of acrylic as butylmethacrylate, Curve C, and glycidyl methacrylate, Curve D, at the depths of the composite coating shown on the horizontal axis for a powder clear coat and waterborne base coat composite coating according to the present invention. Curves E and F are the curves for the moving average for Curves C and D, respectively. The moving average was determined by averaging every two points.

The PGC/MS data of FIGS. 2 and 3 clearly indicate migration of the clear coat to the base coat primer interface for FIG. 3. The degree of acrylic migration was found to be greater for the composite coating with the powder clearcoat of Example 13 at a depth in the basecoat region of 60.2 to 80 microns. Such a composite coating was found to exhibit good chip properties. This is compared to the composite coating of Comparative Example I which gave less desirable chip properties and had much less migration in the basecoat region of 63.5 to 81.4 microns as shown in FIG. 2.

Therefore, what is claimed is:

1. Multilayered composite film over a substrate, wherein the composite film comprises a clear coat layer over a base coat layer, said multilayered composite film made by a process comprising:

a) forming a base coat layer over a substrate, said base coat layer:
      i) having a film thickness in the range of 2.54 to 76.2 microns,
      ii) being formed by dehydrating a waterborne coating without total curing at a temperature up to 90° C. for up to 10 minutes, and
      iii) comprising:
         a. at least one film-forming polymer compatible with the functional acrylic film-forming polymer or copolymer in a powder coating used in forming a clear coat layer,
         b. at least one pigment, and
         c. at least one crosslinking agent for said at least one film-forming polymer compatible with the functional acrylic film-forming polymer or copolymer; and b) forming a clear coat layer over the base coat layers said clear coat layer:
      i) having a film thickness in the range of 35 to 100 microns,
      ii) being formed by co-curing a powder coating, said powder coating has a glass transition temperature (Tg) of at least 25° C., and said powder coating comprising:
         a. a predominant amount of a functional acrylic film-forming polymer or copolymer comprising at least one acrylic polymer or copolymer having a weight average molecular weight in the range of 2000 to 6000, wherein the amount of functionality in the functional acrylic film-forming polymer or copolymer is at least 40 weight percent of the resin solids of the powder coating, and
         b. at least one curing agent.

2. Multilayered composite film of claim 1 having a primer layer formed between the substrate and the base coat layer, wherein the primer layer has a film thickness in the range of up to 40 microns.

3. Multilayered composite film of claim 1, wherein the waterborne coating comprises the functional acrylic film-forming polymer or copolymer of the powder coating.

4. Multilayered composite film of claim 1, wherein said waterborne coating comprises at least one film-forming polymer or copolymer selected from the group consisting of: acrylic polymers, acrylic copolymers, urethane polymers and urethane copolymers.

5. Multilayered composite film of claim 1, wherein the functional acrylic film-forming polymer or copolymer of the powder coating comprises at least one epoxy functional acrylic copolymer of glycidyl methacrylate.

6. Multilayered composite film of claim 1, wherein the powder coating comprises:
   a) from 60 to 99.99 percent by weights based on solids of the powder coating, of at least one film-forming polymeric material, wherein the predominant film-forming polymeric material is at least one epoxy functional acrylic copolymer with a styrene content resulting from an amount of styrene monomer in the range of up to about 25 based on the weight percent of the monomers to form the copolymer, and wherein the epoxy functional acrylic copolymer comprises at least one compound selected from the group consisting of:
   i) an epoxy functional acrylic polymer:
      a. having a peak molecular weight in the range of 2000 to 5500, (Mn in the range of from about 1000 to 5000),
      b. having a Tg in the experimental range of 30 to 60° C., (theoretical of 50 to 85° C. by Fox equation), and
      c. formed by polymerizing, under free radical initiated polymerization conditions:
         (i) 35 to 80 percent by weight of a glycidyl functional ethylenically unsaturated monomer, and
         (ii) 20 to 60 percent of a copolymerizable ethylencally unsaturated monomer or mixture of monomers free of glycidyl functionality and comprising about 5 to about 20 percent by weight of styrene, said percentages being based on the weight of (i) and (ii);
   ii) a blend of a first and a second epoxy functional acrylic polymer or copolymer,
      a. wherein the first epoxy functional acrylic polymer or copolymer is selected from the group consisting of epoxy functional acrylic polymers or copolymers having:
         i) a peak molecular weight in the range of about 4500 to about 8000 (Mn of 1000 to 10,000, and
         ii) a Tg in the experimental range of about 40 to 60° C. (40 to 85° C. theoretical) as a high Tg component, and
      b. wherein the second epoxy functional acrylic polymer or copolymer is selected from the group consisting of epoxy functional acrylic polymers or copolymers having:
         i) a peak molecular weight in the range of about 2000 to about 4500 (Mn of 500 to 3000),
         ii) a Tg in the experimental range of about 0 to 30° C. (35 to 125° C. theoretical), and
         iii) an epoxy from glycidyl functional ethylenically unsaturated monomer having a higher than that of the other epoxy functional acrylic copolymer, and
   b) 10 to 40 percent by weight based on the weight of a) and b) of a polycarboxylic acid crosslinking agent, wherein the ration of epoxy functionality for a) to acid functionality for b) is about 1:0.8 to 1:1.

7. Multilayered composite film of claim 6, wherein the powder coating further comprises an acrylic flow control polymeric additive.

8. Multilayered composite film of claim 6, wherein the powder coating further comprises a catalyst.

9. Multilayered composite film of claim 6, wherein the powder coating further comprises anti-popping agent in amounts of from 0.5 to 3.0 percent by weight based on total weight of the powder coating.

10. Multilayered composite film of claim 6, wherein the powder coating further comprises at least one ultraviolet light stabilizer selected from the group consisting of: (2-tert-butyl-2-(4-hydroxy-3,5-di-tert-butylbenzyl)[bis(methyl-2,2,6,6,-tetramethyl-4-piperidinyl)]dipropionate) and (2-3',5'-bis(1-methyl-1-phenylethyl)-2'-hydroxyphenyl) benzotriazole).

11. Multilayered composite film of claim 6, wherein the powder coating further comprises 9,10-dihydro-9-oxa-10-phosphaphenanthrene-10-oxide or 3,4,5,6-dibenzo-1,2-oxaphosphane-2-oxide as a white crystalline powder having a specific gravity of 1.40 at 30° C., and a melting point of 118° C. and a boiling point of about 200° C. at 5 mm Hg.

12. Multilayered composite film of claim 6, wherein the powder coating further comprises at least one fatty acid amide.

13. Multilayered composite film of claim 6, wherein in the powder coating, the polycarboxylic acid curing agent is a crystalline aliphatic polycarboxylic acid containing from 4 to 20 carbon atoms.

14. Multilayered composite film of claim 6, wherein in the powder coating, the polycarboxylic acid is dodecanedioic acid.

15. Multilayered composite film of claim 6, wherein in the powder coating, component a) is present in an amount ranging from 70 to 85 percent by weight, and wherein component b) is present in an amount ranging from 15 to 30 percent by weight, said weight percentages being based on the combined weight of components a) and b).

16. Multilayered composite film of claim 6, wherein in the powder coating, the copolymers, the copolymerizable ethylenically unsaturated monomer or mixture of monomers free of glycidyl functionality present in component a) ranges from about 25 to 40 percent by weight.

\* \* \* \* \*

UNITED STATES PATENT AND TRADEMARK OFFICE
CERTIFICATE OF CORRECTION

PATENT NO. : 6,077,608
DATED : June 20, 2000
INVENTOR(S) : Barkac et al.

It is certified that error appears in the above-identified patent and that said Letters Patent is hereby corrected as shown below:

Column 22, claim 1,
Lines 35-36, after the word "curing", please delete "at a temperature up to 90°C for up to 10 minutes".
Line 42, after the word "pigment", please add -- present in an amount ranging from 1 to 80 weight percent, said weight percent being based on the total weight of the waterborne coating used in forming the base coat layer --.
Line 51, after the phrase "co-curing a powder coating", please add -- with the dehydrated waterborne coating --.
Lines 52-53, after the phrase "said powder coating", please delete "has a glass transition temperature (Tg) of at least 25°C, and said powder coating".

Column 23, claim 6,
Lines 15-16, please delete the first phrase "from 60 to 99.99 percent by weight, based on solids of the powder coating of,".
Line 17-18, after the phrase "film-forming polymeric material", please add
-- component present in an amount ranging from 60 to 99.99 percent by weight based on solids of the powder coating --.
Lines 27-28, after the phrase "range of 2000 to 5500,", please delete "(Mn in the range of from about 1000 to 5000),".
Line 30, after the phrase "experimental range of 30 to 60°C", please delete "(theoretical of 50 to 85°C by Fox equation),".
Line 42, after the phrase "percentages being based on the weight of", please add -- said glycidyl functional ethylenically unsaturated monomer, and said copolymerizable ethylenically unsaturated monomer or mixture of monomers free of glycidyl functionality --.
Line 42, please delete "(i) and (ii)".
Line 50, please delete "(Mn of 1000 to 10,000)".
Line 52, please delete "(40 to 85°C theoretical)".

Column 24, claim 6,
Line 2, please delete "(Mn of 500 to 3000)".
Line 4, please delete "(35 to 125°C theoretical)".
Lines 9-10, please delete the first phrase "10 to 40 percent by weight based on the weight of a) and b) of".
Line 10, after the phrase "a polycarboxylic acid crosslinking agent", please add
-- component present in an amount ranging from 10 to 40 percent by weight, based on the total weight of the at least one film-forming polymeric material component and the polycarboxylic acid crosslinking agent component --.

UNITED STATES PATENT AND TRADEMARK OFFICE
CERTIFICATE OF CORRECTION

PATENT NO. : 6,077,608
DATED : June 20, 2000
INVENTOR(S) : Barkac et al.

It is certified that error appears in the above-identified patent and that said Letters Patent is hereby corrected as shown below:

Column 24, claim 6,
Line 11, after "wherein the" and before "of epoxy", please delete "ration" and insert -- ratio --.
Line 11, after the phrase "ratio of epoxy functionality for", please add -- the at least one film-forming polymeric material component --.
Line 11, please delete "a)".
Line 12, please delete "b)".
Line 12, after the phrase "to acid functionality for", please add -- the polycarboxylic acid crosslinking agent component --.
Line 12, after the phrase "is about", please delete "1:0.8 to1:1" and insert -- 1:0.6 to 1:1.4 --.

Column 14, claim 15,
Line 46, after the phrase "wherein in the powder coating,", please add -- the at least one film-forming polymeric material --.
Line 46, after the word "component", please delete "a)".
Line 47, after the phrase "70 to 85 percent by weight, and wherein", please add -- the polycarboxylic acid crosslinking agent --.
Line 48, after the word "component", please delete "b)".
Line 50, after the phrase "weight percentages being based on the combined weight of", please add -- the at least one film-forming polymeric material component and the polycarboxylic acid crosslinking agent component --.
Line 50, in the last line of the claim, please delete "components a) and b)".

UNITED STATES PATENT AND TRADEMARK OFFICE
CERTIFICATE OF CORRECTION

PATENT NO. : 6,077,608
DATED : June 20, 2000
INVENTOR(S) : Barkac et al.

It is certified that error appears in the above-identified patent and that said Letters Patent is hereby corrected as shown below:

Column 24, claim 16,
Line 54, after the phrase "glycidyl functionality present in", please add -- the at least one film-forming polymeric material --.
Line 54, after the word "component", please delete "a)".

Signed and Sealed this

Nineteenth Day of February, 2002

Attest:

Attesting Officer

JAMES E. ROGAN
*Director of the United States Patent and Trademark Office*